(12) United States Patent
Toebes et al.

(10) Patent No.: US 8,737,770 B2
(45) Date of Patent: May 27, 2014

(54) METHOD AND APPARATUS FOR AUTOMATIC MASH-UP GENERATION

(75) Inventors: John Toebes, Cary, NC (US); Glenn Thomas Millican, III, Mountain View, CA (US)

(73) Assignee: Cisco Technology, Inc., San Jose, CA (US)

( * ) Notice: Subject to any disclaimer, the term of this patent is extended or adjusted under 35 U.S.C. 154(b) by 1003 days.

(21) Appl. No.: 12/371,778

(22) Filed: Feb. 16, 2009

(65) Prior Publication Data
US 2010/0209003 A1 Aug. 19, 2010

(51) Int. Cl.
*G06K 9/60* (2006.01)
*G06F 7/00* (2006.01)

(52) U.S. Cl.
USPC ............ 382/305; 707/723; 707/728; 707/737

(58) Field of Classification Search
USPC .................................. 382/209, 214, 217–223
See application file for complete search history.

(56) References Cited

U.S. PATENT DOCUMENTS

| | | | | |
|---|---|---|---|---|
| 2003/0200091 A1* | 10/2003 | Furuyama et al. | ............ | 704/254 |
| 2006/0015339 A1* | 1/2006 | Charlesworth et al. | ........ | 704/251 |
| 2008/0154889 A1* | 6/2008 | Pfeiffer | ............................... | 707/5 |
| 2009/0006368 A1* | 1/2009 | Mei et al. | ........................... | 707/5 |
| 2009/0087161 A1* | 4/2009 | Roberts et al. | ................... | 386/66 |

* cited by examiner

*Primary Examiner* — Vu Le
*Assistant Examiner* — Soo Park
(74) *Attorney, Agent, or Firm* — P. Su (57) ABSTRACT

In one embodiment, a method includes obtaining a target template and processing the target template to identify at least one component of the target template. The method also includes searching at least one collection of content to identify at least a first instance of content that substantially matches the component of the target template. The first instance of content is presented as substantially matching the component. Finally, a first arrangement that includes the first instance of content is created. Such a first arrangement is associated with a mash-up related to the target template.

25 Claims, 7 Drawing Sheets

METHOD AND APPARATUS FOR AUTOMATIC MASH-UP GENERATION

BACKGROUND OF THE INVENTION

The present invention relates generally to networking.

A mash-up application is an application, e.g., a web application, that allows content from a variety of sources to be combined to create a mash-up. A mash-up is a combination of snippets of content, such as video content, from a variety of sources. The snippets in a mash-up may be combined to make it appear as if a character said something that he or she did not say, or may be combined to make it appear as if multiple characters are all voicing parts of the same dialog.

Generating mash-ups by merging snippets of content from any number of sources may be a relatively complex process. For example, in order for a user to create a mash-up that combines snippets to make it appear as if a character said a sentence, the user generally manually searches various sources to locate snippets of the character saying each word which is included in the sentence. Searching for snippets is often time consuming and difficult.

BRIEF DESCRIPTION OF THE DRAWINGS

The invention will be readily understood by the following detailed description in conjunction with the accompanying drawings, wherein like reference numerals designate like structural elements, and in which.

DESCRIPTION OF EXAMPLE EMBODIMENTS

General Overview

According to one aspect of the present invention, a method includes obtaining a target template and processing the target template to identify at least one component of the target template. The method also includes searching at least one collection of content to identify at least a first instance of content that substantially matches the component of the target template. The first instance of content is presented as substantially matching the component. Finally, a first arrangement that includes the first instance of content is created. Such a first arrangement is associated with a mash-up related to the target template.

Description

A mash-up tool which obtains a target template from a user and presents the user with snippets which are likely to match components, e.g., phrases, of the target template, facilitates the creation of mash-ups. Such a tool may analyze a target template provided by a user, search at least one collection of content for exact or approximate matches to components of the target template, present the user with the exact or approximate matches, and allow the user to select from amongst the exact or approximate matches. Once matches, as for example snippets, are selected for each component of the target template, the tool may substantially automatically generate an edit decision list (EDL) and/or a mash-up.

In one embodiment, analyzing a target template may include performing a phoneme analysis on the target template. A phoneme analysis may include identifying phonemes, and then grouping the phonemes into components or phrases associated with the target template. As will be appreciated by those skilled in the art, a phoneme is the smallest structural, or contrastive, unit in the sound system of a language. Once a target template is segmented or otherwise parsed into phonemes, the phonemes may be grouped into phrases. A mash-up tool may identify potential matches to the phrases of the target template in at least one collection of snippets or, more generally, in at least one collection of assets or content. The mash-up tool may then present the potential matches to a user, and allow the user to select the matches he or she wishes to include in a mash-up. Hence, using selections provided by the user, the mash-up tool may substantially automatically create a mash-up from a target template.

Figure 1:
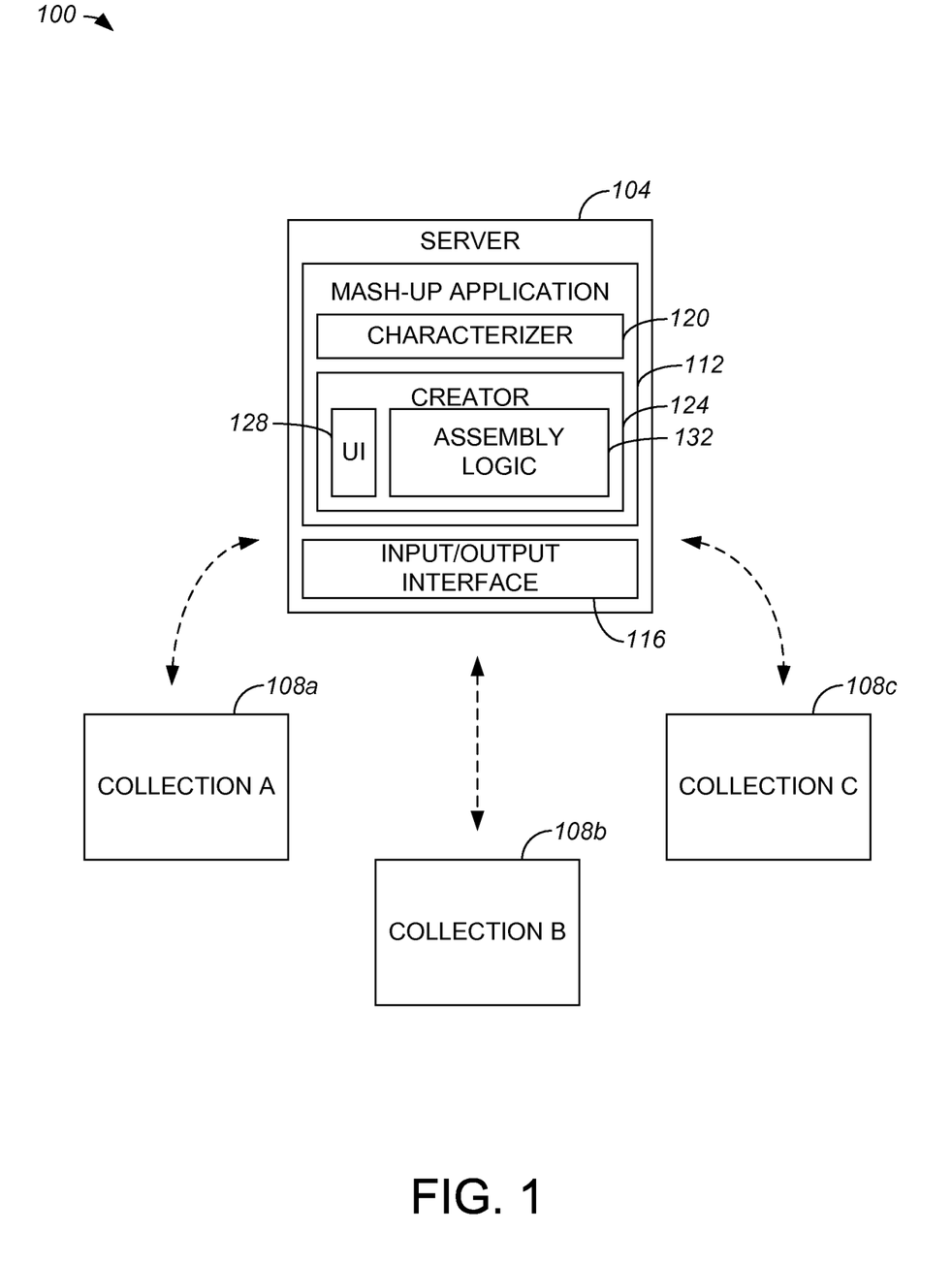
FIG. 1 is a block diagram representation of a system which includes a mash-up application arranged to automatically generate mash-ups in accordance with an embodiment of the present invention.

Referring initially to FIG. 1, a system which includes a mash-up tool or application arranged to automatically generate EDLs and/or mash-ups will be described in accordance with an embodiment of the present invention. A system 100 includes a server 104 which hosts a mash-up application or tool 112. Mash-up application 112 is generally arranged to process a target template provided by a user, e.g., through an input/output interface 116, and to provide the user with an interface which allows for the selection of assets to use in generating a mash-up based on the target template. In general, mash-up application 112 may be implemented as hardware and/or software logic that is executed by server 104.

System 100 also includes at least one collection 108a-c of content or assets that may be used in the creation of a mash-up. Collections 108a-c may be collections of video and/or audio clips. Collections 108a-c may either be local to server 104, or may be remote and accessible through input/output interface 116.

Mash-up application 112 includes a characterizer 120 and a creator 124. Characterizer 120 is arranged to process a target template in order to identify phrases in the target template. For example, characterizer 120 may be configured to perform a phoneme analysis on a target template, and to cluster phonemes identified during the phoneme analysis into phrases. Characterizer 120 may further be arranged to perform phoneme analyses on the content in collections 108a-c, and to cluster phonemes in the content into phrases. Creator 124 is arranged to enable a user to create an EDL and/or a mash-up for a target template. In one embodiment, if creator 124 creates the EDL, creator 124 may provide the EDL to an application (not shown) arranged to create a mash-up for the target template.

Creator 124 includes a user interface 128 and assembly logic 132. User interface 128 allows a user to view and to manipulate video and/or audio clips which exactly match or approximately match the phrases in a target template. User interface 128 also allows a user to select video and/or audio clips. Assembly logic 132 allows an EDL and/or a mash-up to be created. In one embodiment, assembly logic 132 is configured to enable a user to specify preferences which are used by mash-up application 112 to select appropriate clips from collections 108a-c. For instance, assembly logic 132 may allow a user to specify a profile for preferred voices.

Figure 2:
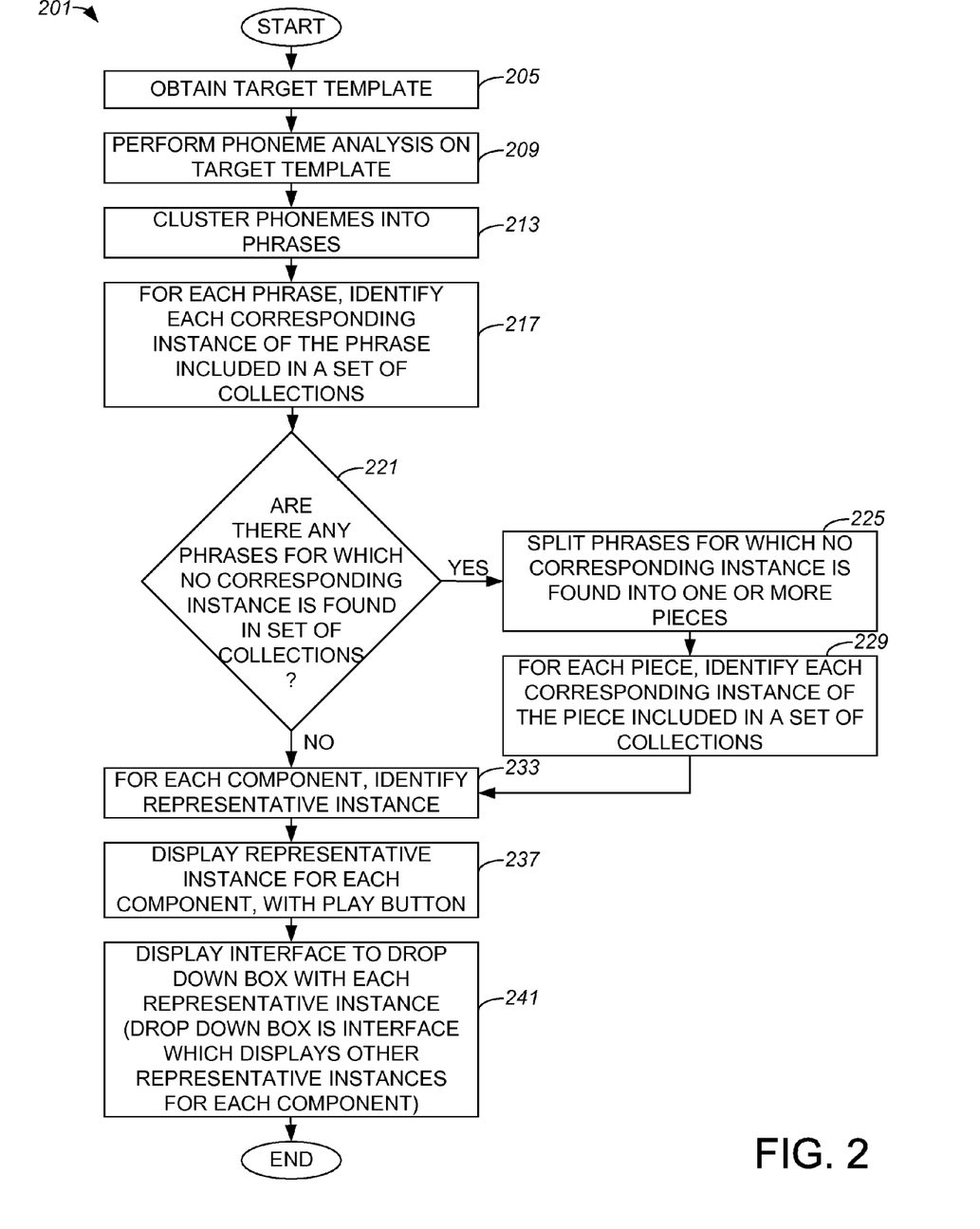
FIG. 2 is a process flow diagram which illustrates a method of providing a user with phrases associated with a target template from the point-of-view of a mash-up application in accordance with an embodiment of the present invention.

With reference to FIG. 2, one method of analyzing a target template and presenting a user with an interface that may be used to identify instances, e.g., snippets or clips, which match phrases in the target template will be described in accordance with an embodiment of the present invention. A process 201 of analyzing a target template and presenting a user with an interface begins at step 205 in which a mash-up application or tool obtains a target template, e.g., from the user. Upon obtaining the target template, the mash-up application performs a phoneme analysis, or otherwise causes a phoneme analysis to be performed, on the target template in step 209. A phoneme analysis may include, but is not limited to including, generating an index of substantially all phonemes included in the target template, as well as identifying soft in points and soft out points of the phonemes.

After a phoneme analysis is performed on the target template, the phonemes identified by the phoneme analysis are clustered into phrases in step 213. One process of clustering phonemes into phrases will be described below with reference to FIG. 3. Once the phonemes are clustered into phrases, e.g., words, each phrase is analyzed in step 217. For each phrase, corresponding instances, as for example assets such as snippets or clips, included in at least one collection of content are identified. That is, substantially all locations where a phrase occurs in each accessible collection of content are identified.

In general, a mash-up application may access any number of collections of content. Some of the collections may already have phonemes and phrases identified. For those collections for which phonemes and phrases have not previously been identified, a phoneme analysis may be performed substantially in real-time when the collections are accessed by the mash-up application. By way of example, if a user specifies a collection of content that he or she wishes to be utilized by a mash-up application, the mash-up application may perform a phoneme analysis on the content at the time the user specifies the collection of content.

After corresponding instances of phrases in the target template are identified, it is determined in step 221 whether there are any phrases in the target template for which no corresponding instances, or matches, have been found in any accessible collection. In other words, a determination is made as to whether there are any phrases for which substantially no matching snippets or clips have been located. A matching snippet or clip may be either an exact or approximate match to a phrase in the target template. It should be appreciated that any suitable matching algorithm may generally be used to match snippets or clips to phrases in a target template.

If the determination in step 221 is that matches for each component, e.g., phrase, of the target template have been located in the accessible collections, then in step 233, a representative instance or match is identified for each phrase of the target template. For example, if two matches to a given phrase are located, one of the matches may be identified as being a representative instance while the other match may be identified as an alternative instance. Once a representative instance is identified for each phrase of the target template, the representative instance for each phrase or, more generally, component, are displayed with a play button in step 237. In the described embodiment, it is assumed that a display screen is arranged to display representative instances for each phrase substantially simultaneously. It should be appreciated, however, that a display screen may be configured to display only some number of representative instances at a given time, while a scrolling or refreshing process may be used to cause other representative instances, along with their respective play buttons, to be displayed. One example of a display screen which may be configured to display substantially only some number of representative instances at a given time will be discussed below with respect to FIGS. 4A and 4B.

An interface to a drop down box is displayed with each representative instance in step 241. The interface is arranged to be activated to cause a drop down box to be displayed. In one embodiment, a representative instance may be associated with a first selection in a drop down box. A drop down box may be associated with each phrase or, more generally, component, and may display other representative instances for each phrase or component which has more than one representative instance. It should be appreciated that if a particular phrase or component has substantially only one representative instance, the interface to an effectively empty drop down box may be displayed. After an interface to a drop down box is displayed with each representative instance, the process of analyzing a target template and presenting a user with an interface is completed.

Returning to step 221, if it is determined that there are phrases for which no corresponding instance is found in a set of collections, the phrases for which no corresponding instance is found are split into one or more pieces in step 225. In some instances, the one or more pieces may be phonemes. Corresponding instances, or matches, for each piece are identified in accessible collections in step 229. It should be appreciated that if a substantially exact match for each piece may not be located, a best match may be identified as a corresponding instance. From step 229, process flow moves to step 233 in which a representative instance, or a representative match, for each piece and/or phrase associated with the target template is identified.

Figure 3:
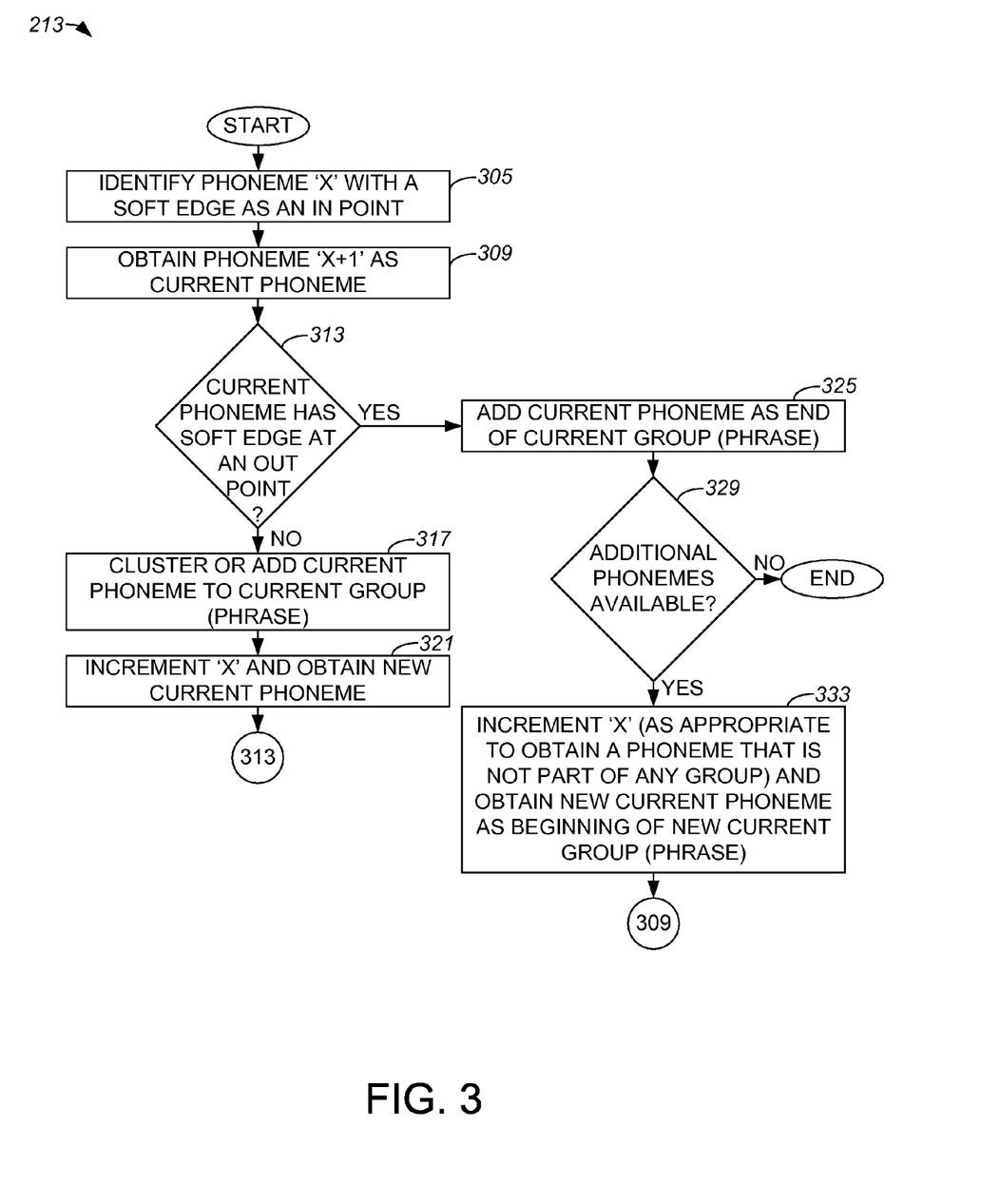
FIG. 3 is a process flow diagram which illustrates a method of clustering phonemes into phrases, e.g., step 213 of FIG. 2, in accordance with an embodiment of the present invention.

FIG. 3 is a process flow diagram which illustrates a method of clustering phonemes identified in a target template into phrases, e.g., step 213 of FIG. 2, in accordance with an embodiment of the present invention. A process 214 of clustering phonemes identified in a target template into groups or phrases begins at step 305 in which a first phoneme, e.g., phoneme 'X', with a soft edge as an in point is identified. A soft edge is typically an amount of "audio white space" or quiet space before a beginning of a phoneme. Phoneme 'X' is generally the beginning of a current group of phonemes. After phoneme 'X' is identified, phoneme 'X+1' is obtained and identified as a current phoneme in step 309.

A determination is made in step 313 as to whether the current phoneme has a soft edge at an out point. If it is determined that the current phoneme has a soft edge at an out point, the indication is that the current phoneme is likely the ends of a phrase. Accordingly, in step 325, the current phoneme is added as the end of a current group of phonemes, e.g., a current phrase.

Once the current phoneme is added as an end of a current group, it is determined in step 329 whether there are additional phonemes available. In other words, it is determined if the target template includes other phonemes which have not yet been added to any group. If the determination is that no additional phonemes are available, the indication is that all phonemes associated with a target template have been processed. As such, the process of clustering phonemes into groups or phrases is completed.

Alternatively, if the determination in step 329 is that additional phonemes are available, then 'X' is incremented in step 333, and a new phoneme 'X' is obtained as a new current phoneme. The new current phoneme is identified as the beginning of a new current group. In one embodiment, the beginning of the new current group is assumed to have a soft edge as an in point. After the beginning of the new current group is obtained, a next phoneme, e.g., phoneme 'X+1', is obtained and identified as a current phoneme.

Returning to step 313, if it is determined that a current phoneme does not have a soft edge at an out point, the indication is that the current phoneme is not the end of a current group. Hence, process flow proceeds to step 317 in which the current phoneme is clustered or otherwise added to the current group. Then, in step 321, 'X' is incremented and a new current phoneme is obtained. For ease of discussion, it is assumed that the last phoneme associated with a target template has a soft edge at an out point. Hence, there is a new current phoneme available to be obtained in step 321. After the new current phoneme is obtained, process flow returns to step 313 in which it is determined whether the current phoneme has a soft edge at an out point.

Figure 4A:
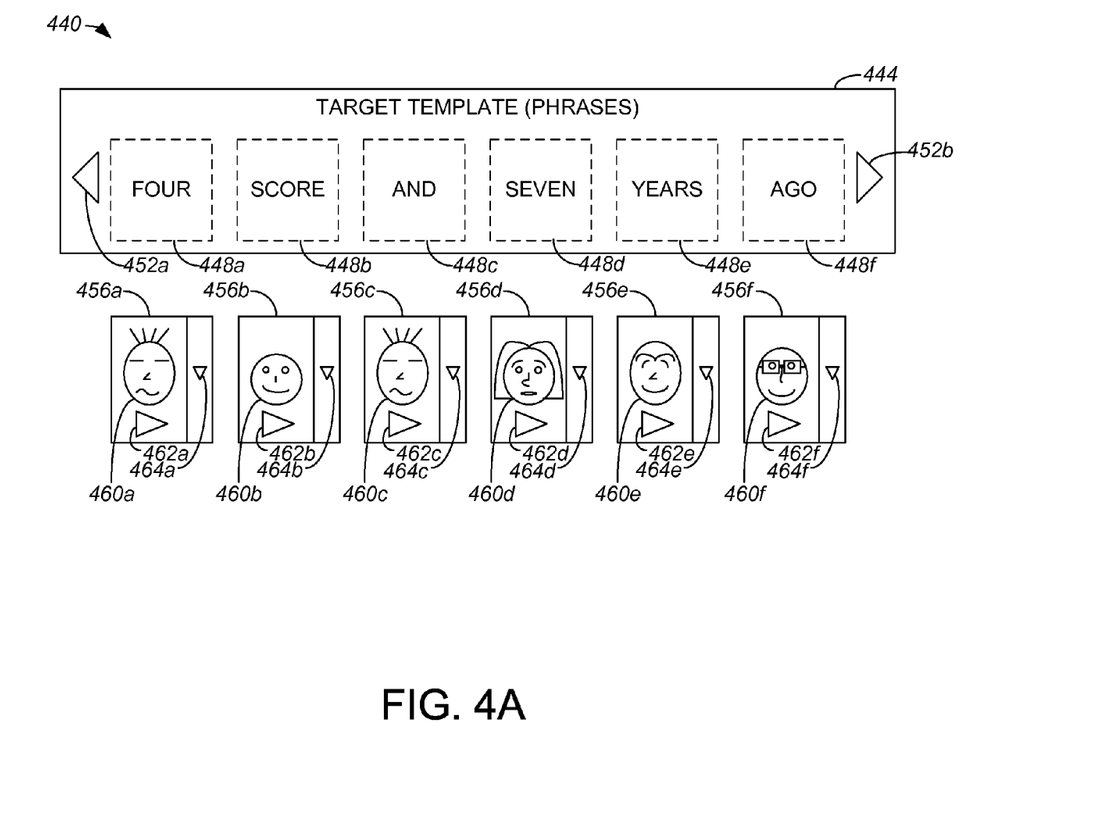
FIG. 4A is a diagrammatic representation of a user interface display in accordance with one embodiment of the present invention.
Figure 4B:
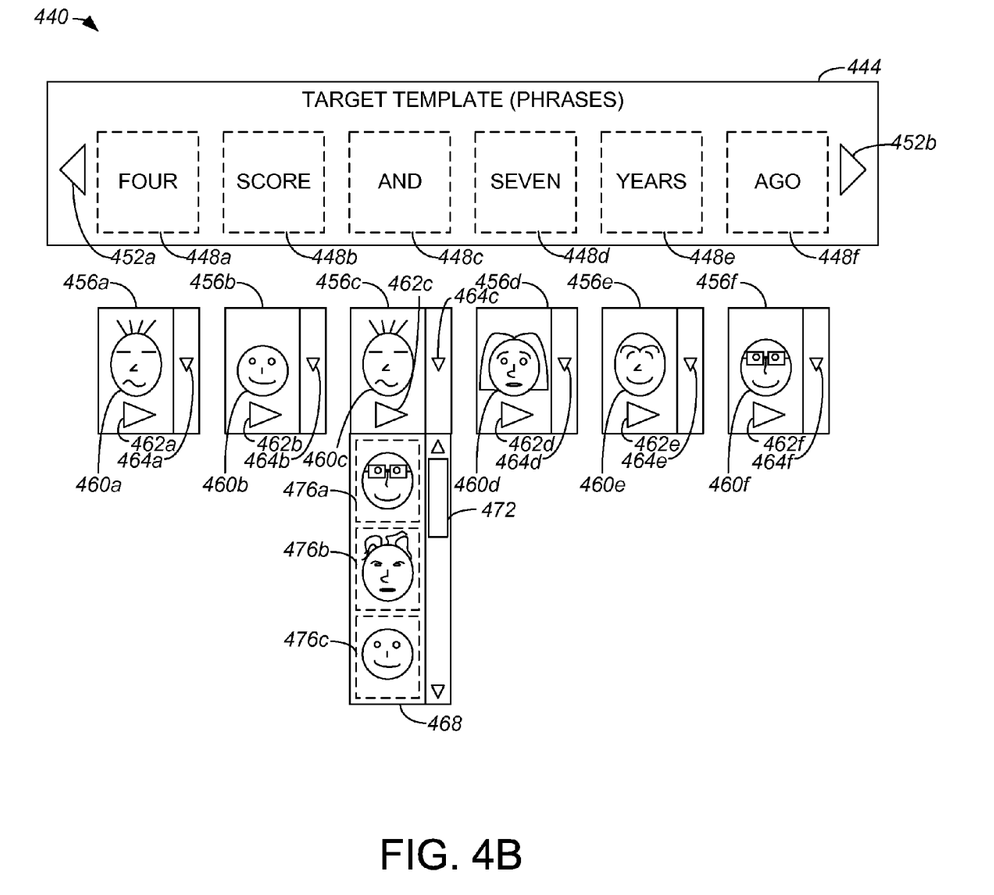
FIG. 4B is a diagrammatic representation of a user interface display, e.g., user interface display 440 of FIG. 4A, after options for one phrase component are displayed in accordance with an embodiment of the present invention.

Referring next to FIGS. 4A and 4B, an example of a user interface which allows a user to select components for use in a mash-up will be described. FIG. 4A is a diagrammatic representation of a user interface display in accordance with one embodiment of the present invention. A display 440, which may be displayed as a web page on a screen associated with a computing system, includes a representation 444 of a target template. Representation 444 may include images 448a-f which represent phrases or components of a target template. In the embodiment as shown, representation 444 also includes repopulation arrows 452a, 452b which may be selected to scroll through, or otherwise advance through, other images (not shown) that represent other phrases included in the target template. For example, the target template may include the words "Four score and seven years ago our fathers," where images representing subsequent phrases of "our" and "fathers" are not displayed unless repopulation arrow 452b is selected. It should be appreciated that when images representing "our" and "fathers" are displayed, images 448a, 448b may no longer be displayed within representation 444.

Images 448a-f may be associated with video snippets or clips such that when a user clicks on or otherwise selects an image 448a-f, a corresponding video clip is played. By way of example, if a user clicks on image 448a, a video clip in which a character utters the phrase "four" may be played. Image 448a may be, for instance, a still image that is arranged to represent the video clip. In one embodiment, image 448a may be an image included in the video clip.

The phrases represented by images 448a-f each have an associated representative instances or blocks 456a-f, respectively, which corresponds to representative instances, e.g., snippets, which are matches to the phrases. While representative blocks 456a-f may include video images 460a-f, respectively, it should be appreciated that text representations and/or audio representations of matches to the phrases may instead be associated with the phrases represented by images 448a-f. Video images 460a-f may be images of characters or individuals that utter phrases represented by images 448a-f, respectively. In one embodiment, if a corresponding asset does not have a corresponding video component, either a blank image, a generic image, or a programmatically generated image may be used instead.

In addition to including video images 460a-f, representative blocks 456a-f each include a play button 462a-f that enables snippets which include video images 460a-f to be played. Representative blocks 456a-f may also each include an interface 464a-f that may be activated to open a menu, e.g., a drop down box, which display video images that are representative of other similar block for the same phrase. Video images 460a-f may represent top selections associated with drop down boxes. A mash-up may be created to include video images 460a-f or, more specifically, the top selections associated with drop down boxes.

As shown in FIG. 4B, activating interface 464c causes a drop down box 468 to be opened beneath representative block 456c. Drop down box 468 includes video images 476a-c which, along with video image 460c, are effectively matches to a phrase represented by image 448c. Video images 476a-c may be alternative choices to video image 460c, and are effectively representative of other similar blocks for a phrase. Drop down box 468 also includes a scroll bar 472 which allows a user to scroll through video images 476a-c included in drop down box 468.

In one embodiment, video image 460c may be a preferred selection for use in a mash-up. Video images 476a-c may be displayed in drop down box 468 in an order of preference, e.g., in an order that is effectively dictated by the preferences of a user. That is, video images 460c and 476a-c may be ordered by best match to the target phrase. A best match may be determined based on factors including, but not limited to including, a preferred pitch and/or whether a desired speaker is male or female. It should be appreciated that user may also request specific speakers to use in generating a mash-up. Hence, video images 460c and 476a-c may be ordered such that a desired speaker is identified as a preferred selection.

Figure 5:
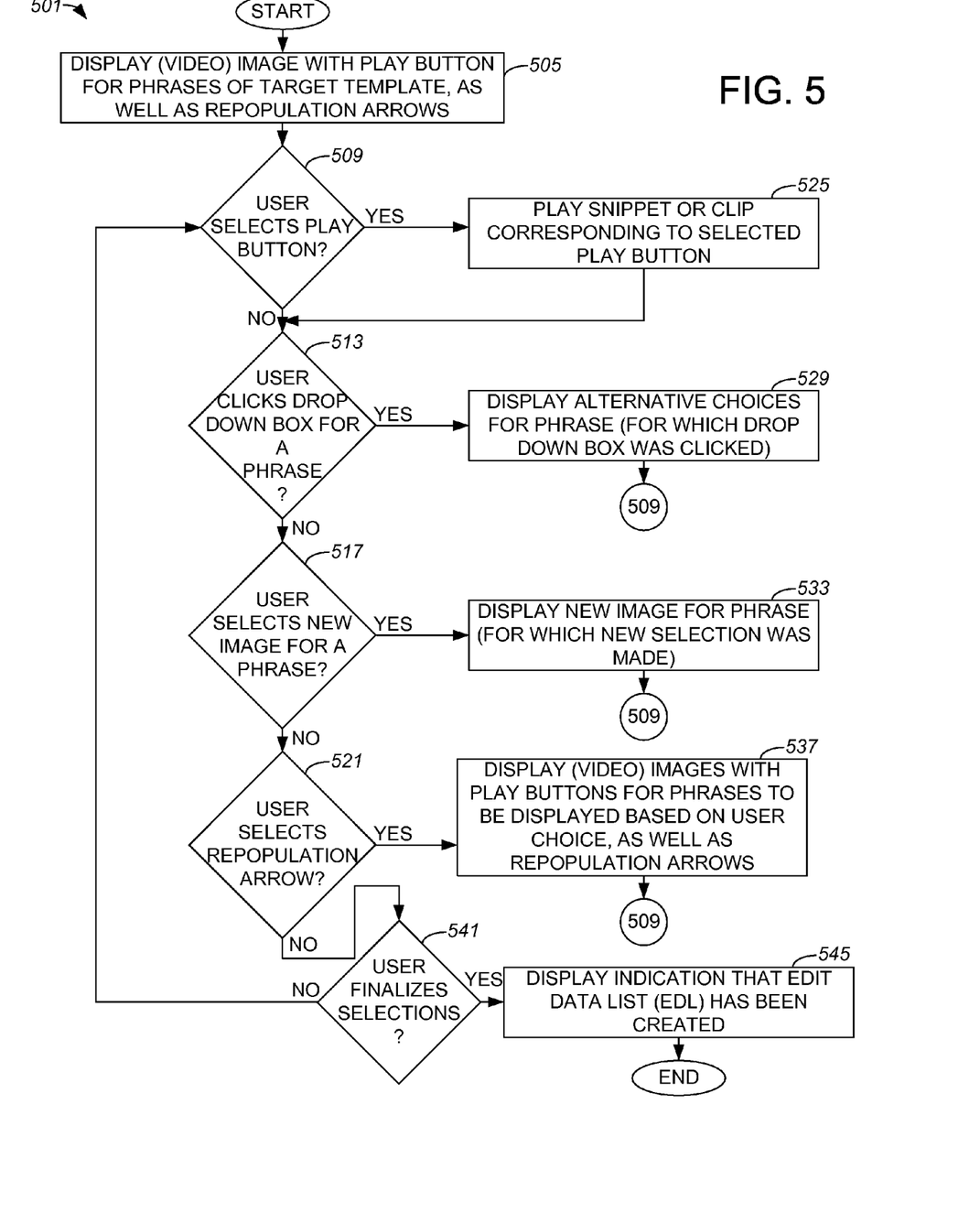
FIG. 5 is a process flow diagram which illustrates a method of updating a display associated with a mash-up application in accordance with an embodiment of the present invention.

In general, a display such as display 440 may be updated or otherwise changed when a user selects from a drop down box, and/or when the user clicks on repopulation arrows. FIG. 5 is a process flow diagram which illustrates a method of updating a display associated with a mash-up application based on user interactions in accordance with an embodiment of the present invention. A process 501 of updating a display based on user interactions begins at step 505 in which an image, e.g., a video image, is displayed along with a play button for each phrase associated with a target template. In addition, repopulation arrows, or arrows which allows additional and/or different phrases associated with the target template to be displayed.

A determination is made in step 509 as to whether a user has selected a play button. In other words, it is determined if a user has activated a play button to play a clip associated with a displayed image. If it is determined that the user has not selected a play button, process flow moves to step 513 in which it is determined whether the user has clicked a drop down box or menu for a particular phrase. That is, it is determined whether the user has elected to display alternative choices for a particular phrase associated with the target template.

If the determination in step 513 is that the user has clicked a drop down box for a phrase, then alternative choices for the phrase are displayed in step 529. Once the alternative choices are displayed, process flow returns to step 509 in which it is determined whether the user has selected a play button. It should be appreciated that the play button may be displayed on a video image that is one of the displayed alternative choices. In one embodiment, more than one play button may be displayed, e.g., one play button for each image may be displayed.

Alternatively, if it is determined in step 513 that the user has not clicked on a drop down box for a phrase, a determination is made in step 517 regarding whether the user has selected a new image for a phrase. In other words, it is determined whether the user has elected to display a new image, or effectively select a new clip, to represent a particular phrase. If it is determined that the user has selected a new image for a phrase, the new image for the phrase is displayed in step 533. After the new image for the phrase is displayed, process flow returns to step 509 in which it is determined whether the user has selected a play button.

On the other hand, if the user has not selected a new image for a phrase in step 517, it is determined whether the user has selected or otherwise activated a repopulation arrow in step 521. If it is determined that the user has selected a repopulation arrow, then in step 537, images are displayed with play buttons for phrases which are displayed when the repopulation arrow is activated. Then, process flow returns to step 509 in which it is determined if the user has selected a play button.

If the determination in step 521 is that the user has not selected a repopulation arrow, then it is determined in step 541 whether the user has finalized selections, i.e., whether the user has substantially settled on which clips are to be included in a mash-up based on the target template. Such a determination may include, but is not limited to including, determining whether the user has provided an indication that the current displayed images are to be included in a mash-up.

If it is determined in step 541 that the user has not finalized selections, then process flow returns to step 509 in which it is determined whether the user has selected a play button. Alternatively, if it is determined that the user has finalized selections, then an indication is displayed in step 545 to indicate that an EDL has been created, and the process of updating a display based on user interactions is completed.

Returning to step 509 and the determination of whether a user has selected a play button, if it is determined that the user has selected a play button, the indication is that the user wishes to play and/or view the clip associated with the play button. Accordingly, in step 525, the snippet or clip corresponding to the selected play button is played. Once the clip is played, it is determined in step 513 whether the user has clicked on a drop down box for a phrase.

Figure 6:
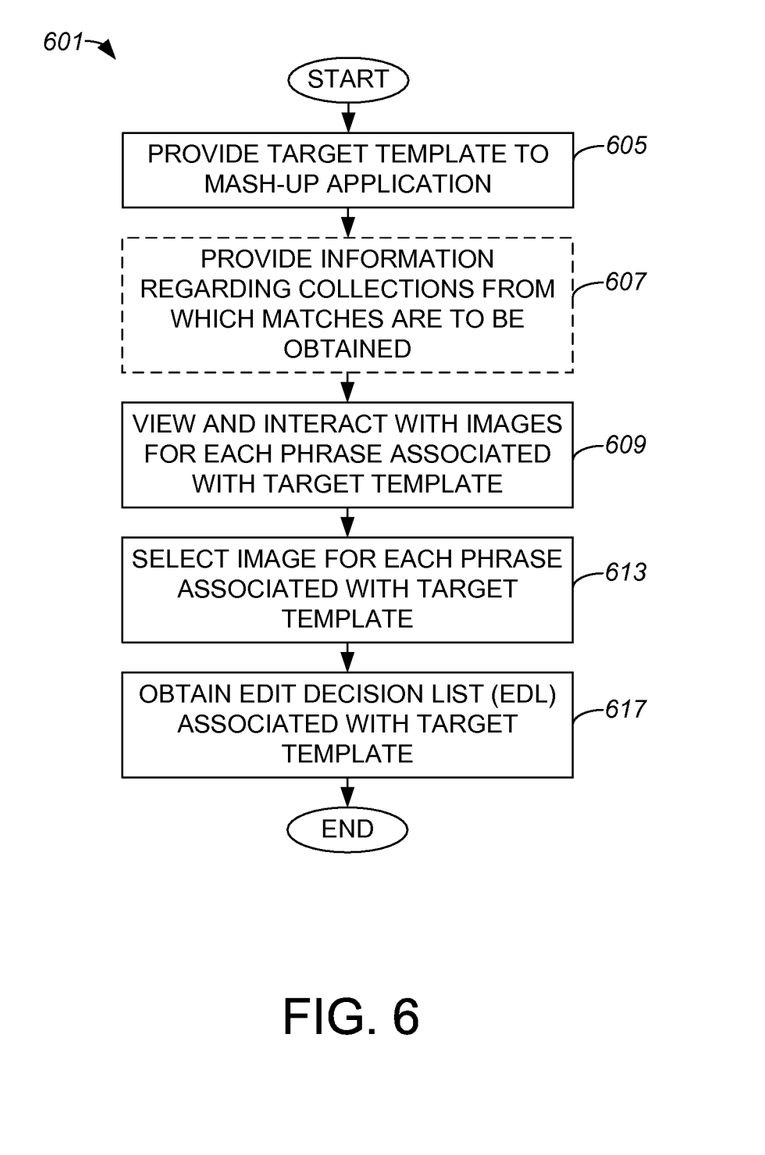
FIG. 6 is a process flow diagram which illustrates a method of acquiring an edit decision list (EDL) based on a target template in accordance with an embodiment of the present invention.

Typically, a mash-up application or tool generates an EDL which may be provided to, for example, a video production application such that a video may be created from the EDL. It should be appreciated that a mash-up application and a video production application may be a part of a single overall application in which an EDL is effectively generated and used. FIG. 6 is a process flow diagram which illustrates a method of acquiring an EDL based on a target template in accordance with an embodiment of the present invention. A process 601 of acquiring an EDL begins at step 605 in which a user provides a target template to a mash-up application. A user may provide a target template by loading the target template into the mash-up application. The target template may be a video clip, an audio clip, and/or a text transcript that the user wishes to match to assets which may be accessed by the mash-up application. Optionally, in step 607, the user may provide information regarding collections from which matches are to be obtained. That is, a user may effectively provide collections of content, e.g., video clips and/or audio clips, which he or she wishes to match to the target template. It should be appreciated that such collections may instead or additionally be identified by the mash-up application. By way of example, a mash-up application may limit the collections used to locate matches to a target template.

The user is presented with images which represent matches to phrases in the target template in step 609. The user may view and interact with the images through a user interface presented by the mash-up application. Interacting with images may include playing video and/or audio associated with the images. After the user views and interacts with the images, the user may select images for each phrase associated with the target template in step 613. In other words, the user selects or otherwise identifies the clips to be used to create a mash-up. Selecting the clips may include displaying the image corresponding to each clip to be used in the creation of the mash-up, and then essentially "clicking" on a button or making a menu selection which substantially locks in the clips to be used in the mash-up.

Once an image for each phrase associated with a target template is selected, the user obtains an EDL from the mash-up application in step 617. The EDL is generated by the mash-up application for the target template. In one embodiment, the EDL may be provided to an external application or program for use in constructing a substantially final asset. One external application which may obtain the EDL is Adobe Premiere, available commercially from Adobe Systems, Inc. of San Jose, Calif. The process of acquiring an EDL is completed after the EDL is obtained.

Although only a few embodiments of the present invention have been described, it should be understood that the present invention may be embodied in many other specific forms without departing from the spirit or the scope of the present invention. By way of example, while a target template has generally been described as being a video clip or an audio clip, the target template is not limited to being a video clip or an audio clip. A target template may generally be any clip or file on which a phoneme analysis may be performed. In one embodiment, a target template may be a text transcript.

A mash-up tool may be configured to allow a user to specify information which is used to analyze a target template and/or to identify snippets which are likely matches to phrases associated with the target template. As previously mentioned, a user may specify information which allows the mash-up tool to determine an order in which likely matches to phrases may be presented. In addition, a user may split a phrase associated with a target template into separate components such that better matches to the phrase may be found.

Filters may be applied to a mash-up tool to prevent a mash-up from including certain phrases, e.g., phrases which include profanity. For example, a mash-up tool may include a setting which identifies profanity in a target template, and blocks the profanity from being matched to snippets or other assets.

A user may be allowed to effectively specify a pitch used by a mash-up tool. Specifying or altering a patch may have an effect on the ordering of potential matches in a drop down list. The pitch may be altered to allow matches to be fit more closely to a target template.

In one embodiment, if no substantially exact match to a phrase associated with a target template may be located by a mash-up tool, the mash-up tool may present a user with the closest match and warn the user that no substantially exact match was found.

While a mash-up application may generally access any number of collections of content, a user may limit the collections of content which are effectively searched to locate matches to phrases in a target template provided by the user. If a user wishes to substantially limit individuals or characters to be used in generating a mash-up, the collections of content that are searched by a mash-up application may be limited to substantially only those collections of content which include the individuals or characters desired by the user. By way of example, if a user wishes to create a mash-up using substantially only characters from his or her favorite movie, the collections of content that are searched may be limited to those collections which include the movie.

The present invention may be implemented as hardware and/or software logic embodied in a tangible medium that, when executed, is operable to perform the various methods and processes described above. For example, the logic that enables a computing system to analyze a target template and to present a user with the ability to select clips which match phrases in the target template may be implemented as hardware logic, software logic, or a combination of both hardware and software logic.

The steps associated with the methods of the present invention may vary widely. Steps may be added, removed, altered, combined, and reordered without departing from the spirit of the scope of the present invention. Therefore, the present examples are to be considered as illustrative and not restrictive, and the invention is not to be limited to the details given herein, but may be modified within the scope of the appended claims.

What is claimed is:

1. A method comprising:
    obtaining a target template, wherein the target template is one selected from a group including a video clip, an audio clip, and a text transcript;
    obtaining at least one preference, the at least one preference being specified separately from the target template, wherein the at least one preference includes one selected from a group including a preferred pitch and a preferred voice;
    processing the target template to identify at least one component of the target template;
    searching at least one collection of content to identify a plurality of instances of content including at least a first instance of content that matches the at least one component of the target template;
    presenting the plurality of instances of content including the first instance of content as matching the at least one component, wherein the plurality of instances of content are presented in an order based on the at least one preference; and
    creating a first arrangement that includes the first instance of content, the first arrangement being associated with a mash-up related to the target template.

2. The method of claim 1 wherein processing the target template includes performing a phoneme analysis on the target template, and wherein the at least one component includes at least one phoneme.

3. The method of claim 1 wherein the target template is a first video clip, and the first instance of content is a second video clip, the second video clip being arranged to match the first video clip.

4. The method of claim 3 wherein presenting the first instance of content includes displaying an image associated with the second video clip and displaying an interface which allows the second video clip to be played.

5. The method of claim 1 wherein the mash-up is an edit decision list (EDL).

6. The method of claim 1 wherein identifying at least the first instance of content includes identifying a second instance of content of the plurality of instances of content, the method further including:
    presenting the second instance of content in a drop down box associated with the at least one component, the first instance of content also being associated with the drop down box, wherein an order in which the first instance of content and the second instance of content is presented is determined by the at least one preference.

7. The method of claim 6 further including:
    determining when the first instance of content has been selected for use in the first arrangement, wherein the first arrangement that includes the first instance of content is created when it is determined that the first instance of content has been selected for use in the first arrangement.

8. The method of claim 7 wherein when it is determined that the first instance of content has not been selected for use in the first arrangement, the method further includes:
    creating a second arrangement that includes the second instance of content, the second arrangement being associated with the mash-up related to the target template.

9. Logic encoded in one or more non-transitory computer-readable media for execution and when executed operable to:
    obtain a target template;
    obtain preferences, wherein the preferences are obtained separately from the target template, wherein the at least one preference includes one selected from a group including a preferred pitch and a preferred voice;
    process the target template to identify at least one component of the target template; search at least one collection of content to identify a plurality of instances of content including at least a first instance of content that matches the at least one component of the target template;
    present the plurality of instances of content including the first instance of content as matching the at least one component, wherein the plurality of instances of content are presented in an order based on the at least one preference; and
    create a first arrangement that includes the first instance of content, the first arrangement being associated with a mash-up related to the target template.

10. The logic of claim 9 wherein the logic operable to process the target template is further operable to perform a phoneme analysis on the target template, and wherein the at least one component includes at least one phoneme.

11. The logic of claim 9 wherein the target template is one selected from a group including a video clip, an audio clip, and a text transcript.

12. The logic of claim 11 wherein the target template is a first video clip, and the first instance of content is a second video clip, the second video clip being arranged to match the first video clip.

13. The logic of claim 12 wherein the logic operable to present the first instance of content is further operable to display an image associated with the second video clip and to display an interface which allows the second video clip to be played.

14. The logic of claim 9 wherein the mash-up is an edit decision list (EDL).

15. The logic of claim 9 wherein the logic operable to identify at least the first instance of content is further operable to identify a second instance of content of the plurality of instances of content, and the logic is still further operable to present the second instance of content in a drop down box associated with the at least one component, the first instance of content also being associated with the drop down box.

16. The logic of claim 15 further operable to:
    determine when the first instance of content has been selected for use in the first arrangement, wherein the first arrangement that includes the first instance of content is created when it is determined that the first instance of content has been selected for use in the first arrangement.

17. The logic of claim 16 wherein the logic is further operable to create a second arrangement that includes the second instance of content and is associated with the mash-up related to the target template when it is determined that the first instance of content has not been selected for use in the first arrangement.

18. An apparatus comprising:
a characterizer, the characterizer being arranged to process a target template to identify at least one component of the target template, wherein the characterizer further performs a phoneme analysis on the target template to identify a plurality of phonemes and clusters the plurality of phonemes into the at least one component;
a first interface, the first interface being arranged to access at least one collection of content; and
a creator, the creator including a user interface and logic, the logic being arranged to identify a first instance in the at least one collection of content that matches the at least one component of the target template, the user interface being arranged to present the first instance and to enable the first instance to be selected for inclusion in a first arrangement, wherein the logic is further arranged to create the first arrangement, the first arrangement being associated with a mash-up related to the target template, the interface further being arranged to obtain a profile, wherein the profile is used to select the first instance from a plurality of instances that matches the at least one component of the target template, the profile being configured to specify at least one preferred voice for use in selecting the first instance from the plurality of instances.

19. The apparatus of claim 18 wherein the apparatus includes the at least one collection of content.

20. The apparatus of claim 18 wherein the first interface is further arranged to obtain the target template and to obtain at least one preference, the at least one preference being obtained separately from the target template.

21. The apparatus of claim 18 wherein the first arrangement is an edit decision list (EDL).

22. The apparatus of claim 21 further arranged to provide the EDL to a mash-up generator, wherein the EDL is configured to allow the mash-up generator to generate the mash-up using the EDL.

23. The apparatus of claim 18 wherein the first arrangement is a mash-up.

24. The apparatus of claim 18 wherein the logic is further arranged to identify a second instance in the at least one collection of content that matches the at least one component of the target template, and the user interface is further arranged to present the second instance and to enable the second instance to be selected for inclusion in the first arrangement.

25. An apparatus comprising:
a characterizer, the characterizer being arranged to process a target template to identify at least one component of the target template, wherein the characterizer further performs a phoneme analysis on the target template to identify a plurality of phonemes and clusters the plurality of phonemes into the at least one component;
a first interface, the first interface being arranged to access at least one collection of content; and
a creator, the creator including a user interface and logic, the logic being arranged to identify a first instance in the at least one collection of content that matches the at least one component of the target template, the user interface being arranged to present the first instance and to enable the first instance to be selected for inclusion in a first arrangement, wherein the logic is further arranged to create the first arrangement, the first arrangement being associated with a mash-up related to the target template, wherein the characterizer clusters the plurality of phonemes into the at least one component by determining whether there is a soft edge in the plurality of phonemes, identifying a first phoneme as a beginning of the at least one component based on the soft edge, and identifying a second phoneme as an end of the at least one component.

* * * * *